United States Patent Office 3,149,168
Patented Sept. 15, 1964

3,149,168
UNSATURATED DIETHERS AND METHOD OF MAKING THE SAME
Sidney I. Karlan, Nutley, and Donald D. Perry, Morristown, N.J., assignors to Thiokol Chemical Corporation, Bristol, Pa., a corporation of Delaware
No Drawing. Filed Oct. 22, 1959, Ser. No. 848,160
7 Claims. (Cl. 260—615)

This invention relates to new compositions of matter and a method of making them, and relates specifically to diethers having both ethylenic and acetylenic unsaturations and to methods of making them.

The novel compounds of the invention are diethers of the formula $$R_1OR_2OR_3$$

where $R_1$ and $R_3$ are olefinically unsaturated aliphatic radicals having at least 3 carbon atoms, advantageously olefinically unsaturated aliphatic hydrocarbons having at least 3 carbon atoms, and $R_2$ is an acetylenically unsaturated aliphatic radical having at least 4 carbon atoms, advantageously an acetylenically unsaturated aliphatic hydrocarbon radical having at least 4 carbon atoms.

The compounds are useful as polymerizable monomers for the preparation of high energy fuels for use in solid propellants, or as precursors for other polymerizable monomers, e.g., diepoxy compounds, useful for compounding propellant fuels.

Such solid propellants, as known to the art, are conveniently made from a mixture of a synthetic, curable, organic polymer and about 60–70 percent by weight of a solid oxidizer, usually an inorganic nitrate or perchlorate salt such as sodium nitrate or sodium perchlorate. The polymer-oxidizer mixture is cast into a rocket casing and cured in situ, and may comprise as fuel binders other castable polymers such as polyesters, polyurethanes, etc.

The novel polyethers of the invention are formed by condensation of olefinic halides with acetylenic diols using a base to dehydrohalogenate the mixture, eg., $$2RX + R'(OH)_2 \xrightarrow{\text{base}} ROR'OR + 2HX$$

As the acetylenic glycol having at least 4 carbon atoms are preferably used diols such as 2-butyne-1,4-diol, 2-pentyne-1,5-diol, 3-hexyne-1,6-diol, 2-pentyne-4-methyl diol-1,5, and other straight or branched chain diols having an acetylenic unsaturation and up to 10 carbon atoms. As is known in the art, an acetylenic alcohol in which the hydroxy group is on the acetylenically linked carbon rearranges, and such alcohols are specifically excluded from the description "acetylenic diols having 4 to 10 carbon atoms."

As the olefinic halides having at least 3 carbon atoms are preferably used materials such as allyl halides, including the bromide and chloride, 1-chloro (or bromo) butene-2, 1-chloro (or bromo) butene-3, and other olefinic halides preferably of the form $$H_2C=CH(CH_2)_nX$$

where X is halogen and $n$ is an integer from 1 to 8.

The ethylenic halides and acetylenic diols are condensed by heating in the presence of a strong base, usually a strong inorganic base such as the alkali metal hydroxides (e.g., NaOH, KOH, LiOH, etc.) and alkaline earth hydroxides (e.g., $Ba(OH)_2$, $Ca(OH)_2$, $Sr(OH_2)$, etc.) The resulting diethers have both acetylenic and ethylenic unsaturations which offer particularly advantageous properties.

For example, the simplest of the materials described is the diallyl ether of butynediol-1,4:

$$H_2C=CHCH_2OCH_2-C\equiv C-CH_2OCH_2CH=CH_2$$

The ethylenic unsaturations of this monomer can be used to polymerize the material in the presence of a free radical or strong acid catalyst to form a polymer having a repeating acetylenic diether unit. Because of the acetylenic linkage, the polymer has a particularly high energy which advantageously adapts it to use as a propellant fuel.

Alternatively, the monomer may be treated with an organic per-acid such as perbenzoic acid or monoperphthalic acid to give a diepoxy compound,

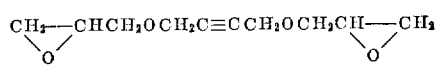

This material may be polymerized as an epoxy, e.g., with bisphenols, in reactions known to the art. The resulting material is, again, a high energy acetylenic polymer.

Before polymerization, the actylenic linkage may be reacted with a nitrogen coordinated decaborane derivative to add a boron-ring to the triple bond. Decaborane, $B_{10}H_{14}$, may be reacted with acetonitrile by refluxing, to yield bis-acetonitrile decaborane, $$2CH_3CN + B_{10}H_{14} \rightarrow (CH_3CN)_2B_{10}H_{12} + H_2$$

The decaborane derivative, when refluxed with the acetylenic monomers of the inventions adds to give a group believed to be

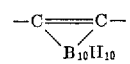

and known as a "carboranyl" or "carborane" group. Polymers of these boron-containing monomers are particularly useful as propellant fuels because of their boron content. Boron is known in the art to have a high heat of combustion.

The materials and reactions herein before mentioned can be conveniently exemplified by reference to the preparation of a specific ethylenic-acetylenic diether of the class described, e.g., the diallyl ether of 2-butynediol-1,4.

Example 43 grams (0.5 mole) of recrystallized 2 butynediol-1,4 were dissolved in 40 ml. of water and 125 (1.03 moles) of distilled allyl bromide were added. The mixture was cooled by an ice-water bath to a temperature of 5° C. A solution of 60 grams (1.08 moles) of potassium hydroxide in 200 ml. of water was added dropwise with vigorous stirring over a period of two hours while a temperature of 5° C. was maintained. After addition of all the potassium hydroxide, the mixture was allowed to warm to room temperature and was then heated at 75° C. for four hours. After cooling, a supernatant oily layer was separated, the aqueous phase extracted with diethyl ether, and the extract and organic layer were combined.

The pooled materials were dried over sodium sulfate and then fractionated under reduced pressure. 42 grams (50.6% of theoretical yield) of a clear, colorless liquid boiling at 104°–106°/10 mm. were obtained. The material is $$CH_2=CHCH_2OCH_2-C\equiv C-CH_2O-CH_2CH=CH_2$$

*Analysis.*—Calculated for $C_{10}H_{14}O_2$: C, 72.26; H, 8.49. Found: C, 72.09; H, 8.36.

Although specific embodiments have been herein shown and described, they are illustrative, and are not to be deemed limiting on the scope and spirit of the invention.

We claim:
1. A compound having the formula

$$R_1OR_2OR_3$$

where $R_1$ and $R_3$ are olefinically unsaturated aliphatic hydrocarbon radicals having 3 to 8 carbon atoms and $R_2$ is an acetylenically unsaturated aliphatic hydrocarbon radical having 4 to 10 carbon atoms.

2. A compound having the formula $$H_2C=CH(CH_2)_nORO(CH_2)_nCH=CH_2$$

where R is an acetylenically unsaturated aliphatic hydrocarbon radical having between 4 and 10 carbon atoms, and $n$ is an integer between 1 and 8.

3. A compound as in claim 2 where R is $$-CH_2-C\equiv C-CH_2-$$

4. 1,4-diallyloxybutyne-2.

5. The method of making ethylenic-acetylenic diethers which comprises mixing a diol of an acetylenically unsaturated aliphatic hydrocarbon having 4 to 10 carbon atoms and a halide of an olefinically unsaturated aliphatic hydrocarbon having 3 to 8 carbon atoms and dehydrohalogenating the mixture by heating in the presence of a strong inorganic base.

6. The method of making ethylenic-acetylenic diethers which comprises mixing an acetylenic diol of the formula $$R(OH)_2$$

where R is an acetylenically unsaturated aliphatic hydrocarbon radical having 4 to 10 carbon atoms, with a halide of the formula $$R'X$$

where R' is an olefinically unsaturated aliphatic hydrocarbon radical having 3 to 8 carbon atoms and X is halogen, and heating the mixture in the presence of a strong base selected from the group consisting of alkali metal hydroxides and alkaline earth hydroxides.

7. The method of making the diallyl ether of 2-butynediol-1,4 which comprises refluxing a mixture of allyl bromide and 2-butyndiol-1,4 in the presence of a strong base selected from the group consisting of alkali metal hydroxides and alkaline earth hydroxides.

References Cited in the file of this patent

Hennion et al.: "J. Org. Chem." 18, 1601–09 (1953).

UNITED STATES PATENT OFFICE
CERTIFICATE OF CORRECTION

Patent No. 3,149,168 September 15, 1964

Sidney I. Karlan et al.

It is hereby certified that error appears in the above numbered patent requiring correction and that the said Letters Patent should read as corrected below.

Column 3, line 10, for "$-CH_2-C=C-CH_2-$" read -- $-CH_2-C{\equiv}C-CH_2-$ --.

Signed and sealed this 12th day of January 1965.

(SEAL)
Attest:

ERNEST W. SWIDER
Attesting Officer

EDWARD J. BRENNER
Commissioner of Patents